Patented May 29, 1923.

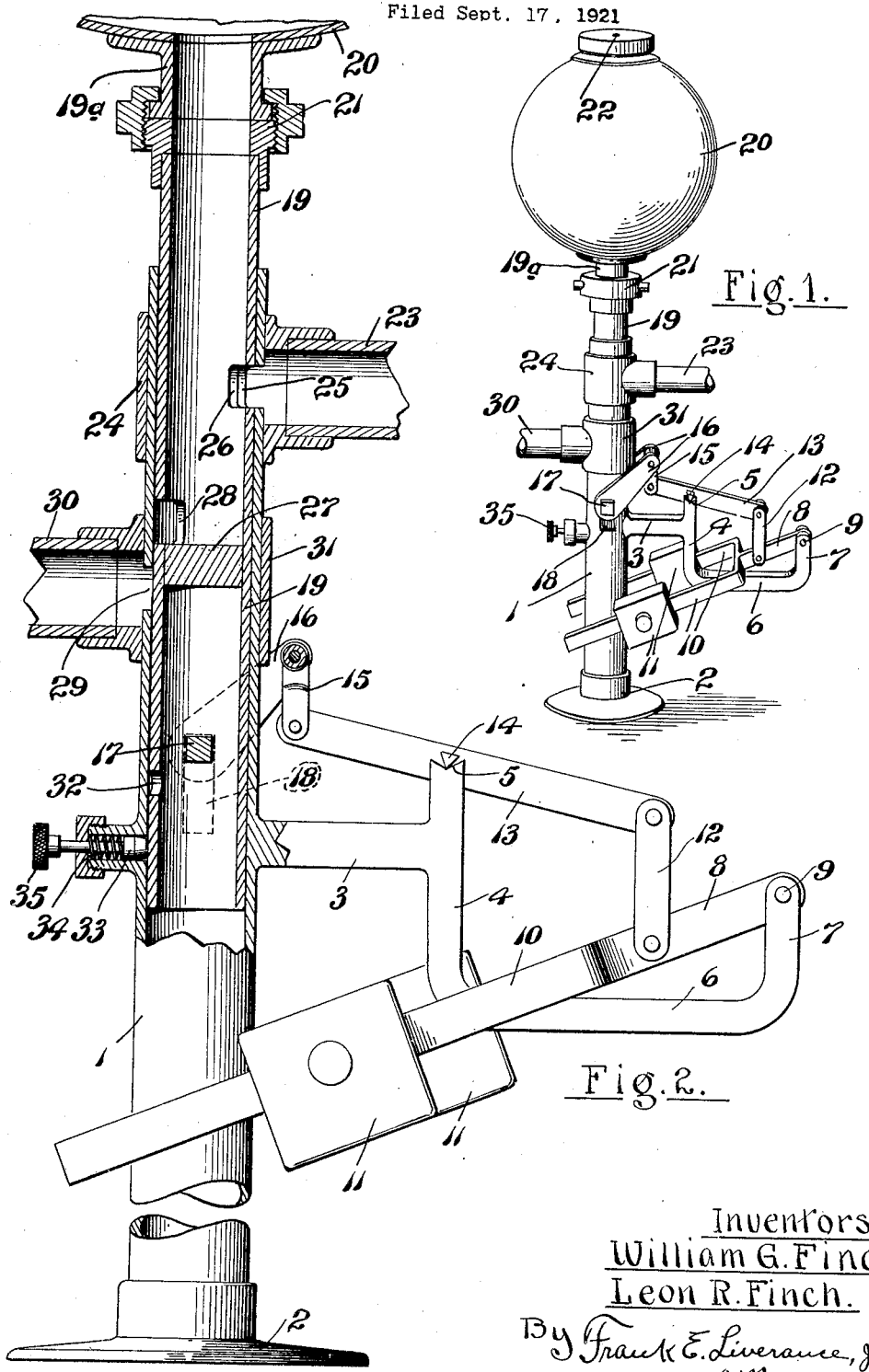

1,457,279

UNITED STATES PATENT OFFICE.

WILLIAM G. FINCH, OF GRAND RAPIDS, AND LEON R. FINCH, OF IONIA, MICHIGAN.

LIQUID-WEIGHING DEVICE.

Application filed September 17, 1921. Serial No. 501,326.

*To all whom it may concern:*

Be it known that we, WILLIAM G. FINCH and LEON R. FINCH, citizens of the United States of America, residing at Grand Rapids and Ionia, respectively, in the counties of Kent and Ionia and State of Michigan, have invented certain new and useful Improvements in Liquid-Weighing Devices; and we do hereby declare the following to be a full, clear, and exact description of the invention, such as will enable others skilled in the art to which it appertains to make and use the same.

This invention relates to fluid weighing machines, and is particularly concerned with a machine of this character which will accurately weigh a prescribed quantity of liquid and contain the same until the desired weight is secured, thereupon operating automatically to discharge the liquid to any desired receptacle. This type of machine is particularly desirable in obtaining substantially exact amounts in weight of the liquid mixture which is used in making ice cream. Heretofore, it has been common to measure such mixture used, but as the specific gravity of the mixture is variable, a greater weight is obtained at one time than at another with such system of measurement with consequent loss. It is desirable that each quantity or charge used shall be of the same weight, with an elimination of inaccuracies and consequent losses, and our invention has for its primary object and purpose the production of a machine which will effectively attain such end. Many other objects and purposes, together with constructions for accomplishing the same will appear as understanding of the invention is had from the following description, taken in connection with the accompanying drawing, in which, Fig. 1 is a perspective view of the liquid weighing machine.

Fig. 2 is an enlarged vertical section therethrough, parts of the machine being broken away on account of lack of space, and other parts being shown in side elevation.

Like reference characters refer to like parts in the different figures of the drawing.

In the construction of the machine, a tubular member 1 is supported vertically being connected at its lower end to a base 2 which may be permanently secured to the floor or other similar fixed horizontal support. From the member 1 at one side and a distance above the base 2 a horizontal arm 3 extends, integrally joining with which is a vertical post 4, at the upper end of which a recess 5 is made substantially V shaped. The post 4 at its lower end is bent to make a horizontal arm 6 located in a plane below the plane of arm 3 and at its outer end said arm 6 is turned upwardly for a short distance as indicated at 7. A bar 8 is pivotally connected to the upper end of part 7, at 9 and extends backwardly and downwardly at an incline over arm 6, being forked and divided to provide two forks 10 to pass one at each side of the arm 6. On each fork 10 a weight 11 is adjustably mounted.

A link 12 is pivotally connected at its lower end to the bar 8 immediately in front of the forked portion thereof and at its upper end has pivotal connection to the outer end of a lever 13 which passes over and at one side of the upper end of post 4, being provided with a laterally projecting triangular pivot member 14, the lower corner of which seats in the angle of the recess 5 making a substantial knife-edge pivotal mount for the lever 13. A member 15 pivotally connected to the inner end of lever 13 is connected to two arms 16 located one at each side of tubular member 1 and secured at their lower ends to a square bar 17 which passes through the member 1 and has a limited vertical travel therein as defined and perscribed by the vertical slots 18 cut in opposite sides of the member 1, bar 17 passing through such slots.

A tube 19 is mounted slidably within the tubular member 1 and extends a distance above the upper end thereof, bar 17 passing through and being connected to the tube. A short extension 19ª lies above and in alinement with the tube 19 to the upper end of which a hollow container 20 is fixed. A coupling 21 connects the tube 19 and the part 19ª while the container 20 has a vent opening 22 in its upper side. This container is shown as of spherical form but it is obvious that it may be of different shapes. It has an opening in its lower side in alinement with the vertical passage through tubes 19 and 19ª.

An inlet pipe 23 is connected to the member 1 adjacent the upper end thereof by means of a T connection 24, the member 1 and tube 19 having openings in a side, as indicated at 25 and 26, which are adapted to come into conjunction with each other in one position of the tube with respect to the member 1 and through which openings liquid carried through pipe 23 may be entered into the tube 19. A plug or block 27 is tightly fitted into the tube 19 a short distance below the opening at 26 and directly below a second opening 28 made in the opposite side of the tube 19, which opening in another position of the tube with respect to the member 1 is adapted to come into conjunction with a second opening 29 made in the side of the member 1 so as to discharge and deliver liquid carried in the container 20 outwardly through an outlet pipe 30 connected with the member 1 by a suitable coupling 31, as shown.

When the container is empty, the weights 11 on forks 10 of bar 8, serve to hold the tube 19 in an upper position, as indicated in Fig. 2, with openings 25 and 26 in conjunction with each other. The liquid may then be allowed to enter through pipe 23, it being understood that the main receptacle for such liquid is attached to said pipe and that the head of liquid is sufficient to cause it to pass upwardly into the container 20. This will continue until the weight of liquid in the container and tube is sufficient to overbalance the weights 11, whereupon the tube is moved downwardly in the member 1 until opening 28 comes into conjunction with opening 29, permitting the outward flow of the liquid in the container 20 and tube 19 above plug 27. In the downward movement of the tube, an opening 32 in a side thereof comes to a latching bolt 33 spring actuated by a spring 34 to seat in the opening and hold the tube in a fixed position with openings 28 and 29 in proper alinement. After the liquid has drained from the container through pipe 30 to any desired receptacle, the tube and container still remain in place until the latch is disengaged by pulling on the operating head 35, whereupon weights 11 act to elevate the tube and attached container to upper position with the openings 25 and 26 in alinement ready for the filling of the container 20 with another charge.

The construction, while applicable to weighing liquids of any character is particularly valuable for the weighing of charges of ice cream mixture for introduction into the freezers, each and every charge being substantially exact in weight and equal in amount. The variation is less than a fraction of one per cent in the different charges or batches, making it possible to have an exact line on costs of materials going into each quantity of ice cream made. Before, with bulk measurement, the weights varied considerably, variations as high as six or seven per cent occurring frequently. The construction is relatively simple, can be manufactured and marketed at comparatively low cost, and is effective in every way in operation. The appended claims define the invention and we consider ourselves entitled to all forms of structure coming within their scope.

We claim:

1. A device of the class described, comprising a tubular vertical support, a tube slidably mounted in the support said support and tube having openings in opposite sides located at different heights, the upper openings in said tube and support being adapted to come into conjunction at one position of the tube and the lower openings at another position of the tube, an inlet pipe connected with the support at the upper opening, an outlet pipe connected with the support at the lower opening, a plug in the tube below the lower opening thereof, a container attached at the upper end of the tube, a supporting bracket secured to and extending from the tubular support, an arm pivotally connected to the bracket, weights adjustably mounted on the arm, a lever pivotally mounted between its ends on said bracket, a link connecting one end of the lever with the weight arm, means operatively connecting the other end of the lever with the tube to raise or lower the tube on pivotal movement of the lever, and latching means for automatically holding the tube in lower position when moved thereto, substantially as described.

2. A device of the class described, comprising a tubular vertical support, a tube slidably mounted in the support, said support and tube having openings in opposite sides located at different heights, the upper openings in said tube and support being adapted to come into conjunction at one position of the tube and the lower openings at another and lower position of the tube, inlet and outlet pipes connected with the support at the upper and lower openings therein, a stop plug in the tube below the lower opening therein, a container for liquid at the upper end of the tube, means for holding the tube and attached container in upper position until overcome by weight of liquid carried into the container, and means for holding the tube in lower position when moved thereto by weight of liquid in the container, thereupon permitting the escape of the liquid through the outlet pipe.

3. A device of the class described, comprising a tubular vertical support, a tube slidably mounted therein and extending above the upper end thereof, a container attached to the upper end of the tube, a stop plug located across the tube between its ends, said tube having an opening in one side immediately above the plug and a second opening a distance above the first opening, said support also having two openings in its sides adapted to come into conjunction with the openings in the tube at different times when the tube is in an upper and in a lower position, weight actuated means connected with the tube tending to hold it in an upper position, an outlet pipe connected with the support at the lower opening therein, and an inlet pipe connected with the support at the upper opening therein, substantially as described.

4. A device of the class described, comprising a vertical support open at its upper end, a member slidably mounted therein and extending above the support, a container attached to the upper end of the member, said member having an opening downwardly therethrough in conjunction with the interior of the container, and having upper and lower openings in its sides to said first opening in the member, said support also having two openings in its sides adapted to come into conjunction with the openings in said member at different times when the member is in upper and lower position, weight actuated means connected with said member tending to hold it and the attached container in upper position, an outlet pipe connected with the support at the lower opening therein, and an inlet pipe connected with the support at the upper opening therein, substantially as described.

5. A device of the character described, comprising a vertical support, a container movably mounted on the support, weight actuated means for normally holding the container in upper position, means for conducting liquid through a side of the support and upwardly into the container until the weight of liquid passed to the container overcomes the weight so that the container moves to lower position, and means for discharging the liquid from the container outwardly through the side of the support when the container moves to said lower position.

In testimony whereof we affix our signatures.

WILLIAM G. FINCH.
LEON R. FINCH.